(No Model.)
C. H. KINGSBURY.
TREADLE.
No. 310,686. Patented Jan. 13, 1885.
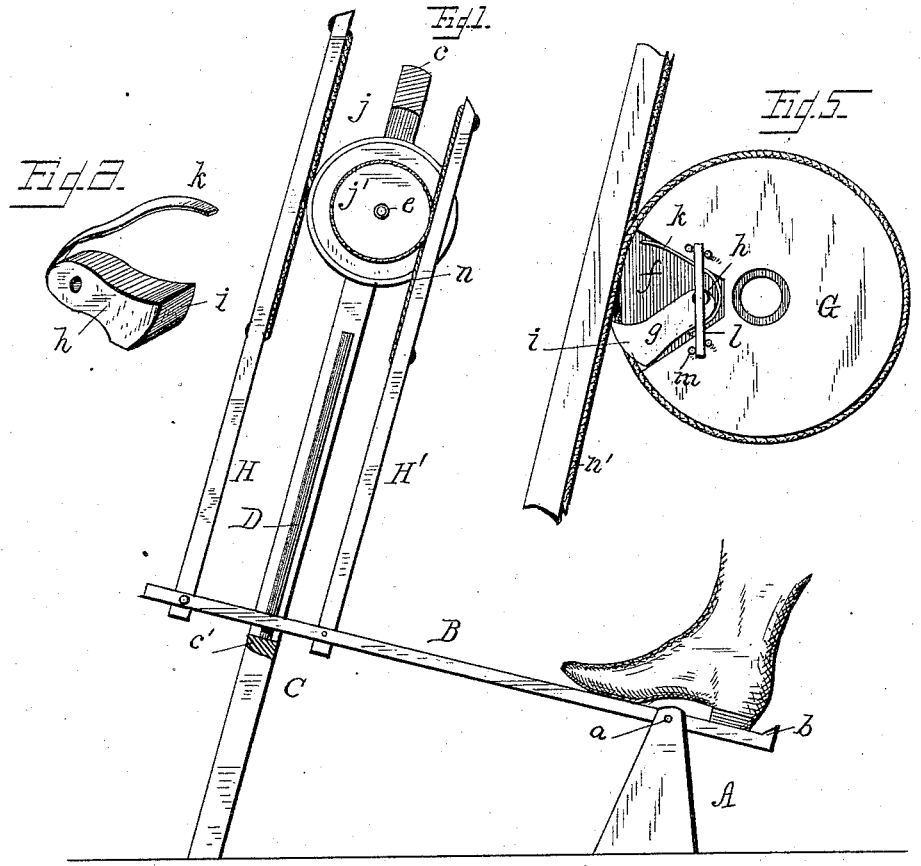
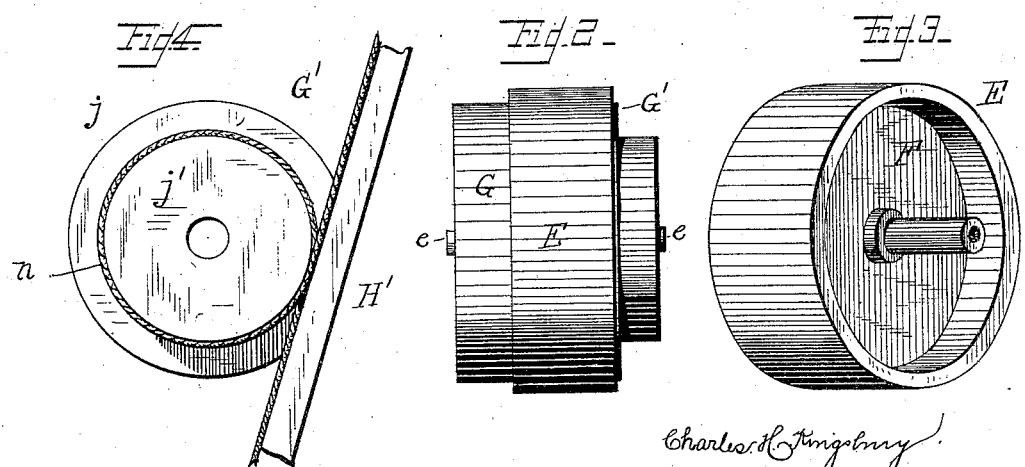
WITNESSES
F. L. Ourand
W. Johnson
Charles H. Kingsbury
INVENTOR
by
Attorney

UNITED STATES PATENT OFFICE.

CHARLIE H. KINGSBURY, OF JAMAICA, VERMONT.

TREADLE.

SPECIFICATION forming part of Letters Patent No. 310,686, dated January 13, 1885.

Application filed February 15, 1883. (No model.)

*To all whom it may concern:*

Be it known that I, CHARLIE H. KINGSBURY, a citizen of the United States, residing at Jamaica, in the county of Windham and State of Vermont, have invented a new and useful Improvement in Transmitting Power, of which the following is a specification.

My invention has reference to a device for transmitting power; and it consists in the improved construction hereinafter fully described and set forth.

In the accompanying drawings, forming part of this specification, Figure 1 is a side elevation, partly in section, of a device embodying my improvements. Fig. 2 is a detail end view. Fig. 3 is a detail perspective view. Figs. 4 and 5 are detail side views from opposite sides of the device, and Fig. 6 is another detail perspective view.

A represents a block forming a fulcrum for the rear portion of the treadle B, which is pivoted to the upper portion of the block by a pin, $a$, the rear extreme portion of said treadle being provided with a vertical inclined lip, $b$.

C represents a vertically-inclined standard, which forms one of the side bars of a frame containing upper and lower cross-bars, $c$ $c'$. A vertical rod, D, has its lower portion bearing in the cross-bar $c'$, as indicated in Fig. 1, and extends through the treadle B, so as to form a guide for the same in its movement.

$e$ refers to a shaft, which has its bearings in the standards C, between the top bar, $c$, and the upper extremity of the guide-rod D, and carries a band-pulley or drive-wheel, E, the side edges of which project beyond the body portion, to form at each side thereof a depression or recess, F, each of which recesses is adapted to receive, respectively, disks G G'. The disk G is of a circular form, and has a periphery of equal diameter across its transverse width. A recess, $f$, is cut in the side of the disk G, of the shape shown in Fig. 5, and contracted toward its inner portion.

$g$ represents a dog, which is pivoted at its inner end in the recess $f$, as shown, by a pin, $h$, and has a curved enlarged free end portion, $i$, which, when the dog occupies the position illustrated in Fig. 5, will project beyond the periphery of the disk G, so as to bind, bite, and engage the inner face of the projecting peripheral portion of the band-pulley E. Therefore, when the disk G is moved in the direction indicated by the arrow, Fig. 5, the band-pulley E will be moved therewith. A reverse movement of the said disk G will throw the dog $g$ to the other side of the recess $f$ and bring its curved face $i$ flush with the periphery of said disk, thereby releasing the engagement of the dog with the pulley E, which does not partake of the rearward movement of said disk. The other disk, G', consists of two portions, $j$ $j'$, the portion $j$ being of a diameter equal to that of the disk G, and adapted to fit snugly within the other chamber or recess, F, of the band-pulley. The other portion, $j'$, is of a diameter considerably less than that of the portion $j$, and the said reduced portion $j'$ extends or projects beyond the side edges of the band-pulley. A leaf-spring, $k$, is secured to the said dog $g$, and is bent around to bear upon the side face of the recess $f$, the tendency of this spring being such as to normally hold the dog $g$ in the position illustrated in Fig. 5.

$l$ indicates a flat spring, which spans the recess $f$ near its inner portion, and is secured on the side of the disk G by pins $m$, so as to bear upon the pivots $h$ of the dog $g$. It likewise bears upon the rear portion of the dog, and prevents it from moving off its pivot. The portion $j$ of the disk G' is provided with a recess containing a spring-dog in all respects similar to that described with reference to the disk G, but with the exception that the dog $g$ is reversed, so as to act upon the band-pulley E, when the disk G' is revolved or partially revolved in a direction the reverse to that indicated by the arrow in Fig. 5.

H H' represent parallel pitmen, which are pivotally connected at their lower ends to the treadle B, as shown in Fig. 1, the pitman H being connected on one side of the bar $c'$, near the extreme portion of the treadle, while the pitman H' is connected to said treadle on the opposite side of said bar $c'$.

$n$ refers to a cord or cable, which is secured at one end to the upper extremity of the pitman H', then wound around the reduced portion $j'$ of the disk G', and finally secured to the said pitman H' near its center. The said cord or cable $n$ is rigidly attached to the reduced portion of the disk G' by any suitable means. The pitman H is similarly connected to the disk G by a cord, $n'$.

From the foregoing description it will be obvious that as the treadle is vibrated by the foot the pitmen H H' will be simultaneously raised and lowered. As the pitman H is raised its dog $g$ of the disk G engages the band-pulley E and revolves it to the extent of the upward movement of said pitman, a disengagement of the parts of the disk G' being preserved during said upward movement. Now, when the pitmen descend, the dog of the disk G is disengaged, and the dog of the disk G', engaging the said band-pulley, continues the rotation previously acquired. By this means the rapid reciprocation of the pitmen H H' results in an even and steady rotation of the band-pulley without any possibility of the rearward or backward revolution of the same.

By connecting the pitman H' with the reduced portion $j'$ of the disk G', I provide for operating the said disk with the diminished leverage afforded at the point where the pitman H' is connected.

I claim—

1. The combination, in a device for transmitting power, of a band-pulley having projecting peripheral flanges, to form at each side of said pulley a recess, disks located on each side of said pulley, located partly in said recesses, and provided, respectively, with dogs, each adapted to engage said peripheral portion when the disks are rotated in opposite directions, as described, a treadle, and pitmen H H', connected thereto, and each to one of said disks, substantially as set forth.

2. The combination, in a device for transmitting power, of a band-pulley having projecting peripheral flanges, to form at each side of said pulley a recess, disks located on each side of said pulley, located partly in said recess, provided, respectively, with dogs, each adapted to engage said peripheral flanges when the disks are rotated in opposite directions, as described, a reduced portion, $j'$, carried by one of said disks, a treadle, and pitmen H H', connected thereto, and the pitman H connected to one of said disks, and the other to the reduced portion $j'$, substantially as set forth.

3. The combination, in a device for transmitting power, of a band-pulley having projecting peripheral flanges, to form a recess at each side of said pulley, disks located on each side of said band-pulley, located partly in said recess, provided, respectively, with dogs, each adapted to engage said peripheral portions when the disks are rotated in opposite directions, as described, a treadle, a rod, D, extending through and guiding the same, and pitmen H H', connected to said treadle, and each to one of said disks, substantially as set forth.

4. The combination, in a device for transmitting power, of a band-pulley having projecting peripheral flanges to form a recess at each side of said pulley, disks G G', located on each side of said pulley, and located partly in said recess, a disk, G', being provided with a projecting portion, $j'$, a recess formed in each disk, containing a pivoted dog having a curved face, $i$, a spring, $k$, connected to said dog, and operating as described, a treadle, B, and pitmen H H', connected thereto and to the disk G and projecting portions $j'$, substantially as set forth.

CHARLIE H. KINGSBURY.

Witnesses:
J. C. ROBINSON,
LEWIS PHELPS.